United States Patent [11] 3,594,753

| [72] | Inventor | George H. Elenbaas<br>841 Hiawatha Drive, Elkhart, Ind. 46514 |
|---|---|---|
| [21] | Appl. No. | 822,613 |
| [22] | Filed | May 7, 1969 |
| [45] | Patented | July 20, 1971 |

[54] AUTOMATIC TORNADO WARNING DEVICE
11 Claims, 5 Drawing Figs.

[52] U.S. Cl. .................................................. 340/236,
200/83
[51] Int. Cl. ...................................................G08b 21/00
[50] Field of Search.......................................... 340/236,
240; 200/83, 83.31, 83.3, 166 M; 73/393

[56] References Cited
UNITED STATES PATENTS
2,723,388  11/1955  Jacobs......................... 340/236
2,801,408  7/1957  Drasky ....................... 340/236

Primary Examiner—John W. Caldwell
Assistant Examiner—Daniel Myer
Attorneys—Hobbs & Green and Kemon, Palmer & Estabrook ABSTRACT: A tornado sensing and warning device having a housing and a switch with two normally spaced contacts, two pressure-responsive means operating in opposite directions to one another for normally maintaining the contacts in spaced relation, and a means for retarding the operation of one of the pressure-responsive means so that the other means may close the switch in response to a sudden drop in barometric pressure. The mechanism is normally enclosed in the housing containing a signal, such as a buzzer, which is operated when the contacts close in response to a sudden drop in barometric pressure.

PATENTED JUL20 1971

INVENTOR.
GEORGE H. ELENBAAS

BY Hobbs & Green

ATTORNEYS

INVENTOR.
GEORGE H. ELENBAAS
BY Hobbs & Green
ATTORNEYS

AUTOMATIC TORNADO WARNING DEVICE

It is well known that during the time a tornado is in the immediate vicinity, the barometric pressure is unusually low, normally dropping rapidly as the tornado approaches and then returning promptly to the normal barometric range for the weather conditions generally prevailing in the area. While a sudden barometric pressure drop occurs during the presence of the tornado in the vicinity, there is no definite barometer reading at which the sudden drop in pressure occurs or is likely to occur, and there is no definite relationship between the actual barometric pressure and the magnitude of the pressure drop or the minimum reached during the sudden drop in pressure. For example, the barometric pressure for the area in which a tornado is likely to occur may be relatively high so that the start of the sudden drop and the minimum reached during the drop may be within the normal barometric pressure range. Prior tornado-warning devices have endeavored to utilize the sudden pressure drop when a tornado is approaching or is in the vicinity, but they have usually failed to compensate for general barometric conditions in the area, and have, as a result, given false warning signals, either responding to low general barometric pressure conditions to give a signal that a tornado is in the vicinity when there is none, or not responding to the sudden drop resulting from a tornado when there is a high barometric condition in the area. Thus, these prior warning devices were generally unreliable and dangerous to any one relying on them for a tornado warning. It is therefore one of the principal objects of the present invention to provide a tornado sensing and warning device which takes into account the general barometric pressure conditions of the area and superposes onto this reading the sudden drop in pressure which occurs in response to the presence of a tornado in the vicinity, to give a reliable tornado-warning signal.

Another object of the invention is to provide a relatively simple tornado-warning device which will automatically adjust itself to existing general barometric conditions to provide accurate and ready response to an approaching tornado, and which is convenient to use and carry from place to place when weather conditions favorable to tornadoes exist in the area, so that it can effectively warn those relying on the device.

Another object of the invention is to provide a relatively simple tornado-warning device which can easily and readily be placed in a convenient location near the person or persons using the device, or carried from place to place, thus permitting the person or persons to pursue their normal activities, and yet be promptly warned of an approaching tornado, and which can be placed in a dwelling, place of business, or other structure, and left unattended to give automatically a signal of an approaching tornado.

A further object of the invention is to provide a tornado-warning device of the aforementioned type which can easily be transported from place to place with the person, and which will give an effective signal without the person having to watch or otherwise pay particular attention to the device to receive the signal.

Still another object is to provide a device for warning of an approaching tornado which is reliable in operation and rugged in construction, and which can be left unused for long periods of time, and yet operated effectively in the event a tornado approaches, to give an effective signal, and further, which will constantly and rapidly adapt itself to varying barometric pressure conditions so that the sudden drop which occurs with the approach of a tornado will be sensed and a signal produced immediately.

Additional objects and advantages of the invention will become apparent from the following description and accompanying drawings, wherein.

Figure 1:
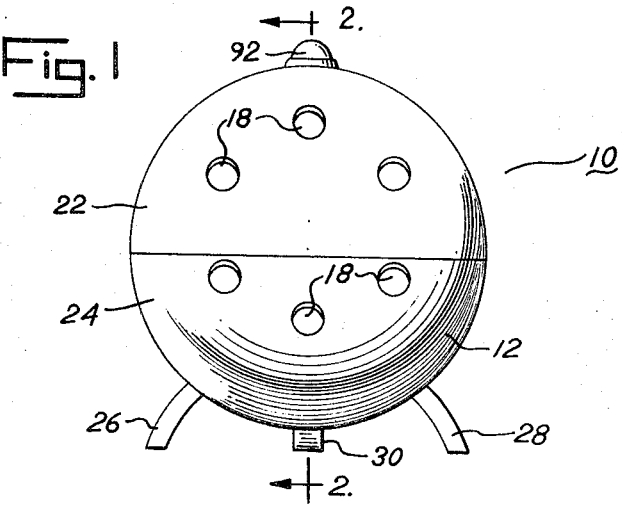
FIG. 1 is a front elevational view of the present tornado-warning device.
Figure 2:
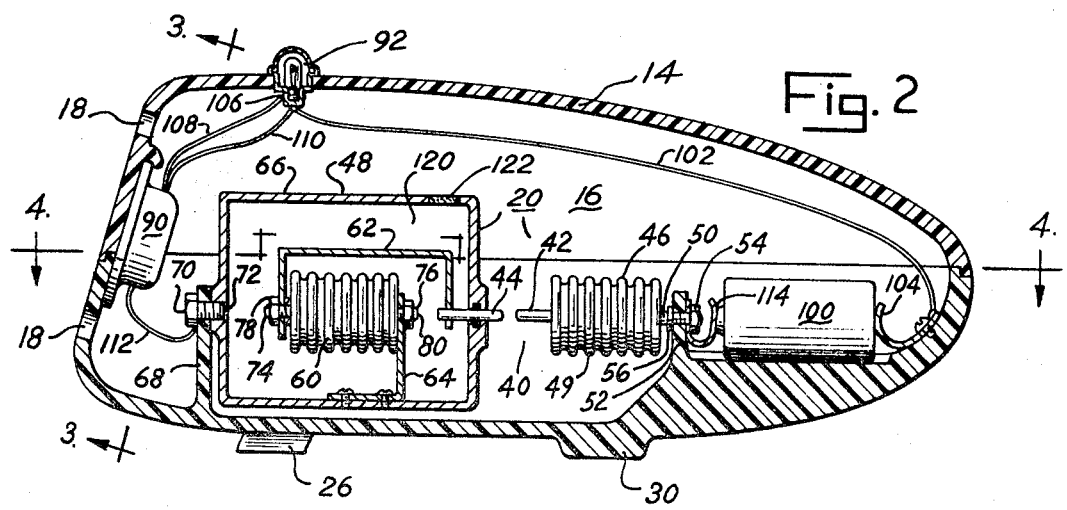
FIG. 2 is a vertical cross-sectional view of the device, the section being taken on line 2-2 of FIG. 1.
Figure 3:
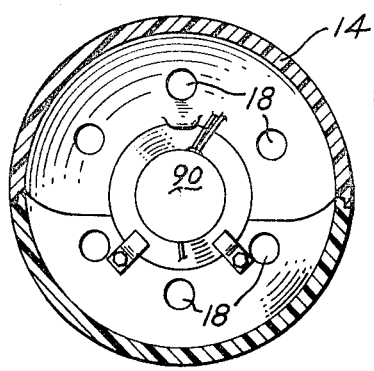
FIG. 3 is a vertical cross-sectional view taken on line 3-3 of FIG. 2.
Figure 4:
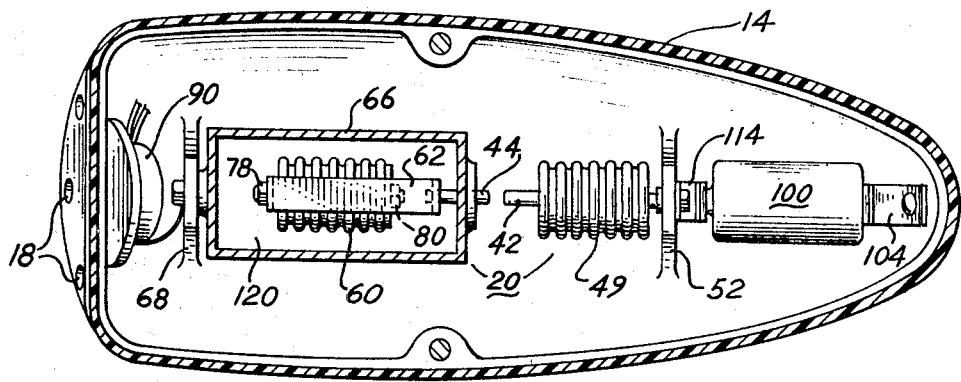
FIG. 4 is a horizontal cross-sectional view of the present device, the section being taken on line 4-4 of FIG. 2.

Referring more specifically to the drawings and to FIGS. 1 through 4 in particular, numeral 10 designates generally the present tornado sensing and warning device, having a round, elongated housing 12 of the portable type. The drawings illustrate a full-scale device, which can be carried from place to place and retained in close proximity to the person or persons relying on the device for a tornado warning. Various shaped housings or casings may be used, and the device may be made smaller so that it can be carried in the pocket or purse, or it may be made in such a manner that it can be mounted on the wall or other permanent supporting structure. The present type of tornado-warning device is readily adaptable to the foregoing uses as well as to industrial or commercial buildings and community warning systems requiring a substantially greater signal than that afforded by the portable type shown in the drawings.

The walls 14 of housing 12 enclose a chamber 16 which communicates with the atmosphere through holes 18, and which contains the tornado-warning operating mechanism identified generally by numeral 20. The housing may be made of plastic, or any other suitable material, and is preferably so designed and contoured that it can easily and conveniently be carried on the person. The housing shown in FIGS. 1 through 4 consists of upper and lower halves 22 and 24, respectively, the lower half having a plurality of legs 26, 28 and 30 for holding the device in an upright position when it has been placed on a supporting structure.

The mechanism 20 includes a switch 40 having contacts 42 and 44, contact 42 being controlled by a pressure-responsive device 46 and contact 44 being controlled by a pressure-responsive device 48. The pressure-responsive device 46 consists of a bellows 49 having contact 42 mounted rigidly on one end and being supported by stem 50 and a rigid support structure 52 joined integrally with the wall 14 of housing 12. Stem 50 is held in place by a nut 54 threaded onto the stem and by a collar 56 seated on the side of support structure 52. The pressure-responsive device 48 includes a bellows 60 of identical size, construction and operational rate as bellows 49, connected to contact 44 by a linkage 62 extending from the left-hand end of bellows 60 to the contact on the right-hand side thereof. The bellows is rigidly held in place on a supporting structure 64 within a casing 66, which in turn is rigidly supported on a supporting structure 68, formed integrally with the wall of housing 12, by a screw 70 extending through the supporting structure and being threadedly received in an opening 72 in the end of the casing. Attached to opposite ends of bellows 60 are stems 74 and 76, the former stem being connected to linkage 62 and the latter stem being connected to supporting member 64 by nuts 78 and 80 threadedly received on the respective stems 74 and 76.

The warning signal may be a sound-producing device such as buzzer 90 mounted in chamber 16 of housing 12 and/or a light 92 mounted on the upper wall of the housing. Either one of these two signal devices may be used; however, it is preferable that both be used in most such devices. The buzzer and light are operated by a battery 100 connected to the light and buzzer by a lead 102 connecting contact 104 at the end of the battery to light 92 at contact 106. Contact 106 and the buzzer are connected by leads 108 and 110. The circuit to contact 44 is completed by lead 112 and casing 66 which is constructed of copper, brass or other suitable electrical conducting material, and the two contact 42 and 44 and contact 114 extending between stem 50 and the end of battery 100. Lead 112 is connected to screw 70, which in turn forms an electrical connection with casing 66. Support 64 is of electrical conducting material, as is linkage 62, and the two bellows are constructed of metal or other suitable electrical conducting material. Compartment 120 of casing 66 is essentially airtight with the exception of a porous ceramic button 122 which permits only a slow flow of air into and from the casing. Any suitable adjustable valve or port means may be used; however, the flow of air therethrough necessarily must be relatively limited in order to produce the desired responsiveness of the device to a rapid decline in barometric pressure as will be more fully described herein.

In the operation of the present tornado-warning device, the two contacts 42 and 44 are spaced in such a manner that a rapid decrease in barometric pressure will result in a closing of the two contacts by expansion of bellows 49 at a much faster rate than bellows 60. With the device assembled in the manner illustrated in FIGS. 2 and 4, under normal operation the two bellows 49 and 60 expand and contract at the same rate, thus maintaining the distance between the two contacts 42 and 44 constant. While the atmospheric conditions remain normal, the two bellows continue to operate with the distance between the ends of the two contacts remaining the same regardless of variations in normal barometric pressure; i.e. as bellows 49 expands, contact 42 moves to the left, as viewed in FIGS. 2 and 4, and bellows 60 expands likewise, moving contact 44 to the left, thus maintaining the desired distance between the two contacts. When a tornado approaches the vicinity where the device is located, a sudden drop in barometric pressure occurs, thus causing bellows 49 to expand rapidly, and likewise rapidly advancing contact 42 to the left. Bellows 60, however, is prevented from producing a corresponding rapid retraction of contact 44 by casing 66, which completely encloses bellows 60 with the exception of the porous ceramic bottom 122. Thus, contact 42 overtakes contact 44 and closes switch 40, completing the circuit from the battery 100 through leads 102 and 108 to light 92 and buzzer 90. Lead 112, casing 66, support 64, bellows 60 and linkage 62 complete the electric circuit to contact 44 of switch 40, and bellows 49, stem 50, and contact 114 complete the electric circuit from contact 42 to the opposite end of the battery. The decreased barometric pressure created by the tornado surrounding housing 12 and in chamber 16 causes the air to flow from chamber 120 of casing 66 through the porous ceramic button, thereby reducing the pressure surrounding bellows 60 to the same degree as that surrounding bellows 49 and reestablishing the normal relationship between the contacts 42 and 44 and hence opening the switch. Selection of the porosity of the ceramic button results in a predetermined time delay, and hence in a predetermined time in which the buzzer and light will be operating. Persons in the surrounding area are warned by the light and buzzer while the unequal air pressure condition exists between chamber 16 and chamber 120. The closing of the switch created by the unequal pressure between the two chambers may be varied by selecting different porous ceramic buttons or by adjusting a port controlled by a valve used in place of the porous ceramic button. After the tornado has left the vicinity, the device continues to operate in the normal manner with the pressure surrounding the two bellows being substantially the same and the two contacts in spaced relation. In this condition the bellows are always ready to respond to the unequal conditions created by a sudden drop in barometric pressure devolving from an approaching tornado. The device performs automatically and is constantly in effective operation capable of producing a signal to warn those in the vicinity of a device without any prior presetting or other preparation of the device being required.

Figure 5:
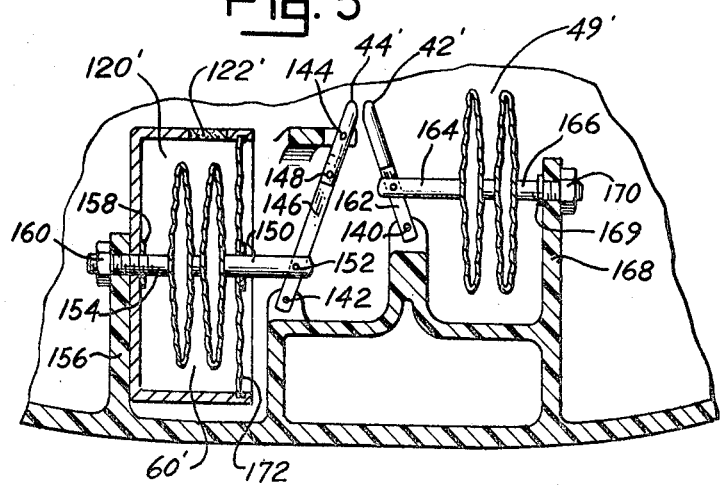
FIG. 5 is a fragmentary cross-sectional view of a modified form of the present tornado-warning device.

The device illustrated in FIG. 5 is essentially the same as the one shown in the preceding figures, the primary difference being the type of bellows and contacts used. Since the device is fundamentally the same as that previously described herein, some of the same numerals plus primes are used for like parts. In the modified unit the two bellows operate in the same direction and the movement between the two contacts is correlated by the single pivot point 140 of contact 42' and the dual-pivot points 142 and 144 of contact 44'. The contact 44' is operated by a lever 146 pivotedly connected to the contact by pin 148, and pivotedly connected to stem 150 by a pin 152, stem 150 being connected to the bellows, which in turn is supported by stems 150 and 154 on a supporting structure 156, collar 158, and nut 160 threaded onto the end of stem 154. Contact 42' is mounted on a lever 162, which is connected to the bellows 49' by a stem 164, the bellows being supported by a stem 166 mounted on supporting member 168 and secured thereto by collar 169 and nut 170 threadedly received on stem 166. The bellows 60' is mounted in chamber 120' which communicates with the atmosphere through a ceramic disc 122' similar to those previously described herein. A flexible wall 172 closes one end of chamber 120; however, movement of stem 150 is primarily controlled by the bellows in the chamber. Under normal conditions, compression of the two bellows 49' and 60' by normal variations of barometric pressure causes the two contacts 42' and 44' to move to the left, but maintaining a substantially constant space between the two contacts as illustrated in the drawings. In the event of a sudden drop in pressure from an approaching tornado, bellows 49' expands more rapidly than bellows 60', thus causing contact 42' to overtake contact 44', thus closing a signal circuit such as the one previously described herein.

While only two embodiments of the present tornado sensing and warning device have been described in detail herein, various changes and modifications may be made without departing from the scope of the invention.

I claim:

1. A tornado sensing and warning device comprising a switch means having two contacts movable relative to one another, a first barometric-pressure-responsive means for moving one contact toward the other contact in response to decreases in barometric pressure, a second barometric-pressure-responsive means for maintaining said contacts in substantially the same position relative to one another irrespective of changes in barometric pressure at a normal rate, a means for retarding the response of said second barometric-pressure-responsive means relative to said first barometric-pressure-responsive means in response to a relatively rapid drop in barometric pressure for causing said contacts to close, a signal means, and an electrical circuit connected to said switch means and to said signal means for operating said signal means when said switch contacts are closed.

2. A tornado sensing and warning device as defined in claim 1, in which said first barometric-pressure-responsive means is connected to one of said contacts and said secondary barometric-pressure-responsive means is connected to said other contact.

3. A tornado sensing and warning device as defined in claim 1, in which said means for retarding the response of said second barometric-pressure-responsive means relative to the first barometric-pressure-responsive means consists of a casing around said second barometric-pressure-responsive means and a means for retarding the ambient flow between the inside and outside of said casing.

4. A tornado sensing and warning device as defined in claim 2, in which said means for retarding the response of said second barometric-pressure-responsive means relative to the first barometric-pressure-responsive means consists of a casing around said second barometric-pressure-responsive means and a means for retarding the ambient flow between the inside and outside of said casing.

5. A tornado sensing and warning device as defined in claim 1, in which both of said barometric-pressure-responsive means consist of bellows.

6. A tornado sensing and warning device as defined in claim 4, in which both of said barometric-pressure-responsive means consist of bellows.

7. A tornado sensing and warning device as defined in claim 6, in which said bellows are substantially identical in structure and operation.

8. A tornado sensing and warning device as defined in claim 1, in which a housing encloses the first and second barometric-pressure-responsive means, the signal, and the circuit therefor.

9. A tornado sensing and warning device as defined in claim 7, in which a housing encloses the first and second barometricpressure-responsive means, the signal, and the circuit therefor.

10. A tornado sensing and warning device as defined in claim 1, in which said signal means consists of a buzzer.

11. A tornado sensing and warning device as defined in claim 9, in which said signal means consists of a buzzer and in which said circuit includes a battery.